United States Patent [19]

Wurl

[11] Patent Number: 5,094,504
[45] Date of Patent: Mar. 10, 1992

[54] UPRIGHT PILLAR FOR A VEHICLE BODY STRUCTURE

[75] Inventor: Willi Wurl, Niefern-Oeschelbronn, Fed. Rep. of Germany

[73] Assignee: Dr. Ing. h.c.F. Porsche AG, Fed. Rep. of Germany

[21] Appl. No.: 699,588

[22] Filed: May 14, 1991

[30] Foreign Application Priority Data

Jun. 9, 1990 [DE] Fed. Rep. of Germany ....... 4018593

[51] Int. Cl.$^5$ ............................................. B62D 25/00
[52] U.S. Cl. .................... 296/185; 296/202; 296/203; 296/209; 296/29
[58] Field of Search ............... 296/203, 205, 185, 209, 296/187, 202, 29; 52/731, 730; 29/425

[56] References Cited

U.S. PATENT DOCUMENTS

| | | | |
|---|---|---|---|
| 4,552,400 | 11/1985 | Harasaki et al. | 296/203 |
| 4,826,238 | 5/1989 | Misono et al. | 296/209 |
| 4,840,423 | 6/1989 | Maekawa | 296/203 |
| 4,863,771 | 9/1989 | Freeman | 296/205 |
| 4,988,597 | 1/1991 | Clausen | 296/203 |

FOREIGN PATENT DOCUMENTS 0146716 7/1985 European Pat. Off. .

Primary Examiner—Robert R. Song
Attorney, Agent, or Firm—Evenson, Wands, Edwards, Lenahan & McKeown

[57] ABSTRACT

An upright-pillar for a vehicle body structure which, in the cross-sectional view, has the shape of a box-shaped hollow profile, is made of light metal and is placed on a side member disposed underneath. The pillar has an extruded profile and a closing part connected with it, which provides a pillar for a body structure which, with low-cost manufacturing, is easy to adapt to the shape of the door joint and can easily be connected to the adjacent body parts.

20 Claims, 4 Drawing Sheets

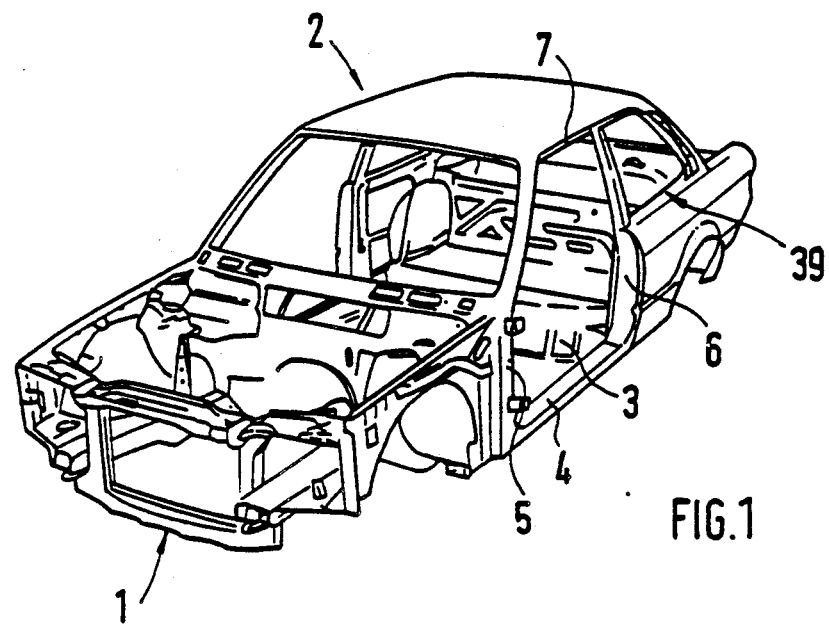
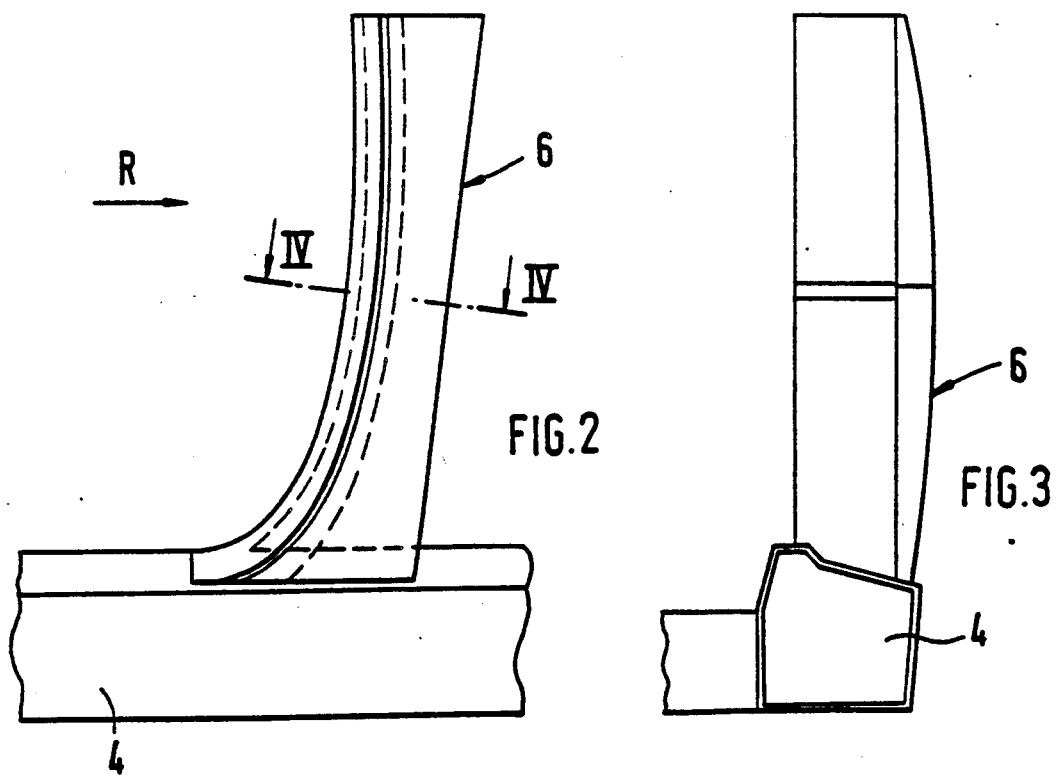

UPRIGHT PILLAR FOR A VEHICLE BODY STRUCTURE

BACKGROUND AND SUMMARY OF THE INVENTION

The present invention relates to an upright pillar for a vehicle body structure, preferably made of a light metal, that has a side member, the pillar being coupled to the side member disposed underneath the pillar, the pillar having, in a cross-sectional view, the shape of a box-shaped hollow-profile.

European Patent Document EP-PS 0 146 716 discloses a body structure made of light metal which has an upright pillar arranged between a side member and a lateral part of the roof frame, the pillar being made of sheet metal.

An object of the present invention is to provide an upright pillar for a body structure such that, while it can be manufactured at reasonable cost, is easily adaptable to the stylistically given shape of the door joint, and that, in addition, adjacent body parts can easily be connected to the pillar.

This and other objects are achieved by the present invention which provides an upright pillar for a vehicle body structure that has a side member, the pillar being coupled to the side member disposed underneath the pillar, this pillar having, in a cross-sectional view, the shape of a box-shaped hollow-profile, wherein the pillar includes an extruded profile and a closing part connected with the extruded profile.

Some of the principal advantages achieved by the present invention are that, as a result of the construction of the pillar from an extruded profile and a closing part connected with it, a low-cost manufacturing of the pillar is achieved. A receiving device for an interior door seal and a fastening of an adjacent body part, such as a fender or side part, can easily be integrated into the extruded profile.

Because of the open profile shape, the extruded profile can easily be adapted to the curved shape of the door joint. By means of the clamped connection, the extruded profile and the closing part can easily be connected with one another by means of laser beam welding without the requirement of an additional chucking device during the welding.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view, diagonally from the front, of a body structure of a passenger car constructed in accordance with an embodiment of the present invention.

FIG. 2 is an enlarged lateral view of a pillar of the passenger car placed on a side member.

FIG. 3 is a view in the direction of the arrow R of FIG. 2.

DETAILED DESCRIPTION OF THE DRAWINGS

Figure 4:
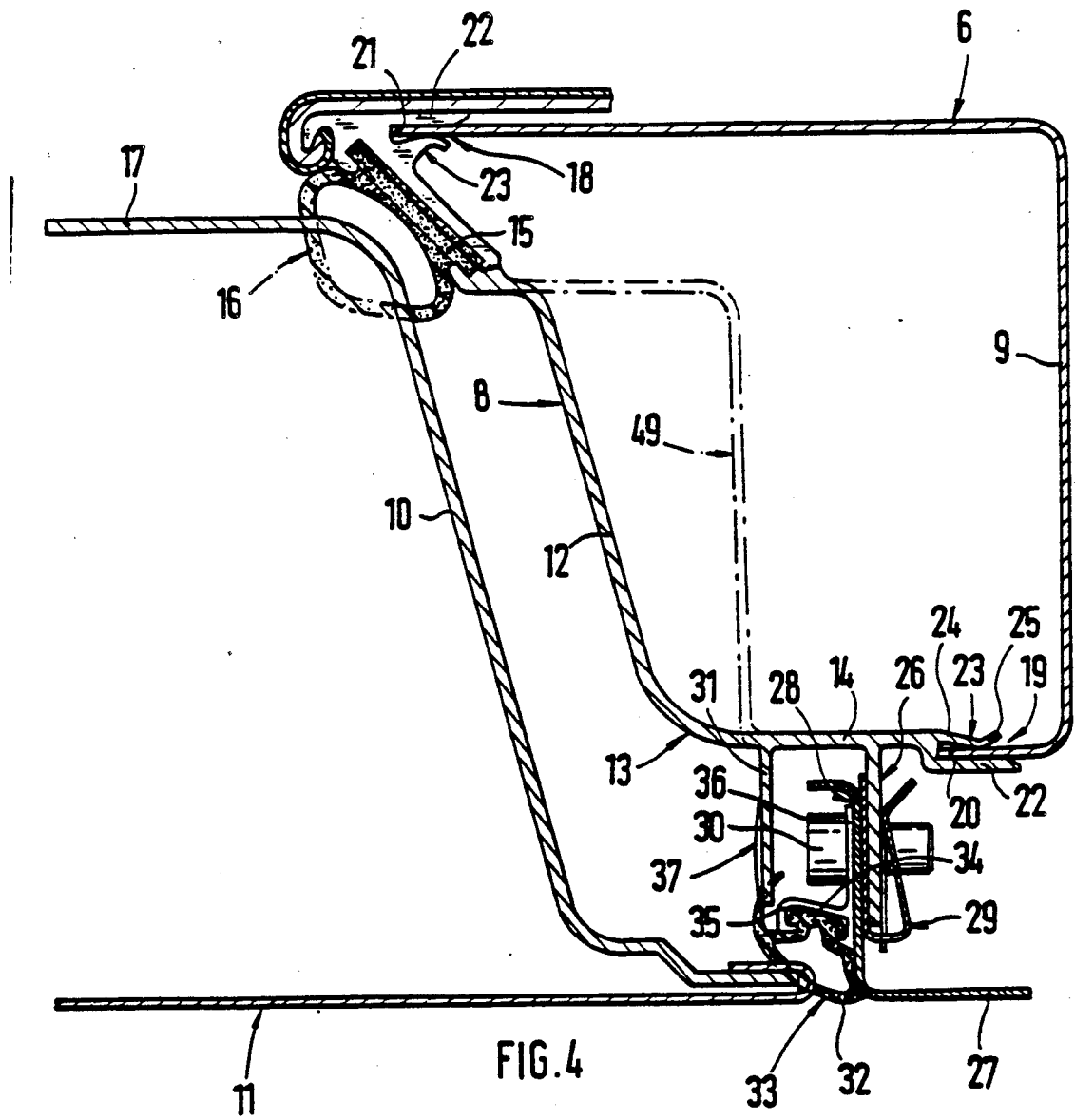
FIG. 4 is an enlarged sectional view according to Line IV—IV of FIG. 2.

FIG. 1 illustrates a body structure 1 of a passenger car 2 which, in the lateral area, has a door opening 3 which is bounded by a side member 4 disposed underneath it, by a forward pillar 5 (A-pillar), by a rearward upright pillar 6, and by a lateral roof frame 7. The rearward pillar 6, which is also called the B-pillar, lock pillar or, in the case of 4-door vehicles, the center pillar, is placed in a butt-jointed manner on the side member 4 disposed underneath it and is fixedly connected with it. This may take place by a thermal connection (welding), by gluing or by a mechanical connection (riveting, screwing or the like).

On the top, the pillar 6 is either directly or by means of a junction element, which is not shown in detail, connected to the lateral roof frame 7. As shown in FIG. 4, in a cross-sectional view, the pillar 6 has the shape of a box-shaped hollow profile and has a profiled extruded section 8 and a closing part 9 connected with it. In a lateral view, the extruded profile 8, along its vertical course, has a curved shape which is adapted to the course of the door joint (see FIG. 5, for example).

Adjacent to a face 10 of a door body a diagonally extending section 12 is provided on the extruded profile 8 and, on its extreme end. Via a radii-shaped transition area 13, the diagonally extending section 12 is connected with a section 14 extending in the longitudinal direction of the vehicle (FIG. 4).

On the diagonally extending section 12, an undercut groove 15 is provided locally into which an inner hose-shaped sealing body 16 is inserted. The sealing body 16 interacts with an side door panel 17 in a sealing manner. The extruded profile 8 has two receiving sections 18, 19 with an approximately U-shaped profile which are arranged at a distance from one another and into which the edge sections 20, 21 of the closing part 9 engage.

The two receiving sections 18, 19 are aligned in the longitudinal direction of the vehicle, one receiving section 19 being arranged on the free end of section 14, and the other section 18 being arranged adjacent to the undercut groove 15. Each receiving section 18, 19 comprises a straight outer leg 22 and a bent inner leg 23. The inner leg 23 comprises two diagonally extending areas 24, 25, the free end of leg 23 extending away from the inserted edge section 20, 21 of the closing part 9.

Each receiving section 18, 19 is constructed such that, when the closing part 9 is slid in, a clamped connection 38 is established between the closing part 9 and the receiving section 18, 19. In other words, the two legs 22, 23 rest against the closing part 9 while being laterally prestressed.

In the area of the section 14 of the extruded profile 8, which extends in the longitudinal direction, at least one outwardly directed web 26 is molded on which extends in the transverse direction of the vehicle and which, in the case of a two-door vehicle, is used for the fastening of a rear side part or of a fender 27 of the body structure 1. The web 26 extends at a narrow distance from the end-side receiving section 19.

An approximately L-shaped end-side flange 28 of the fender 27 rests on one side of the web 26 or on a sheet-metal nut 29 clipped onto the web 26 and, by means of a fastening screw 30 screwed into the sheet-metal nut, is adjustably held in position. The web 26 has an opening for the guiding-through of the fastening screw 30. According to FIG. 4, another web 31 is molded to the extruded profile 8 and extends in parallel and at a distance to the web 26. The fastening of the fender 27 is covered by an exterior hose-shaped sealing body 32 which extends in the area of the door joint 33 and is disposed on a holding strip 34 which is held in position also by the fastening screw 30.

The holding strip 34 has an undercut groove 35 for the sealing body 32 and a longitudinal arm 36, the arm 36 resting against the bent-away flange 28 of the fender 27. On the web 31, an opening is arranged, which is not shown in detail, and through which a tool for the screwing-in of the fastening screw 30 can be guided. After the mounting is completed, the opening is closed by a removable stopper 37.

The closing part 9 is formed by an edged sheet metal part or by an extruded profile part. The extruded profile 8, which has an open shape, and the closing part 9, in addition to the clamped connection 38, are connected with one another by means of gluing, welding, riveting or the like. By means of the clamped connection 38, the extruded profile 8 and the closing part 9 are held in position in such a manner that, for example, a connection is possible by means of laser beam welding without any additional chucking device during the welding.

The closing part 9 has an approximately U-shaped cross-section, the two wall sections, which extend in parallel to one another, extending in the longitudinal direction of the vehicle. The extruded profile 8, the closing part 9 as well as the remaining body structure 1 are made of light metal (aluminum, aluminum alloy, magnesium, or the like) in certain preferred embodiments.

Figure 5:
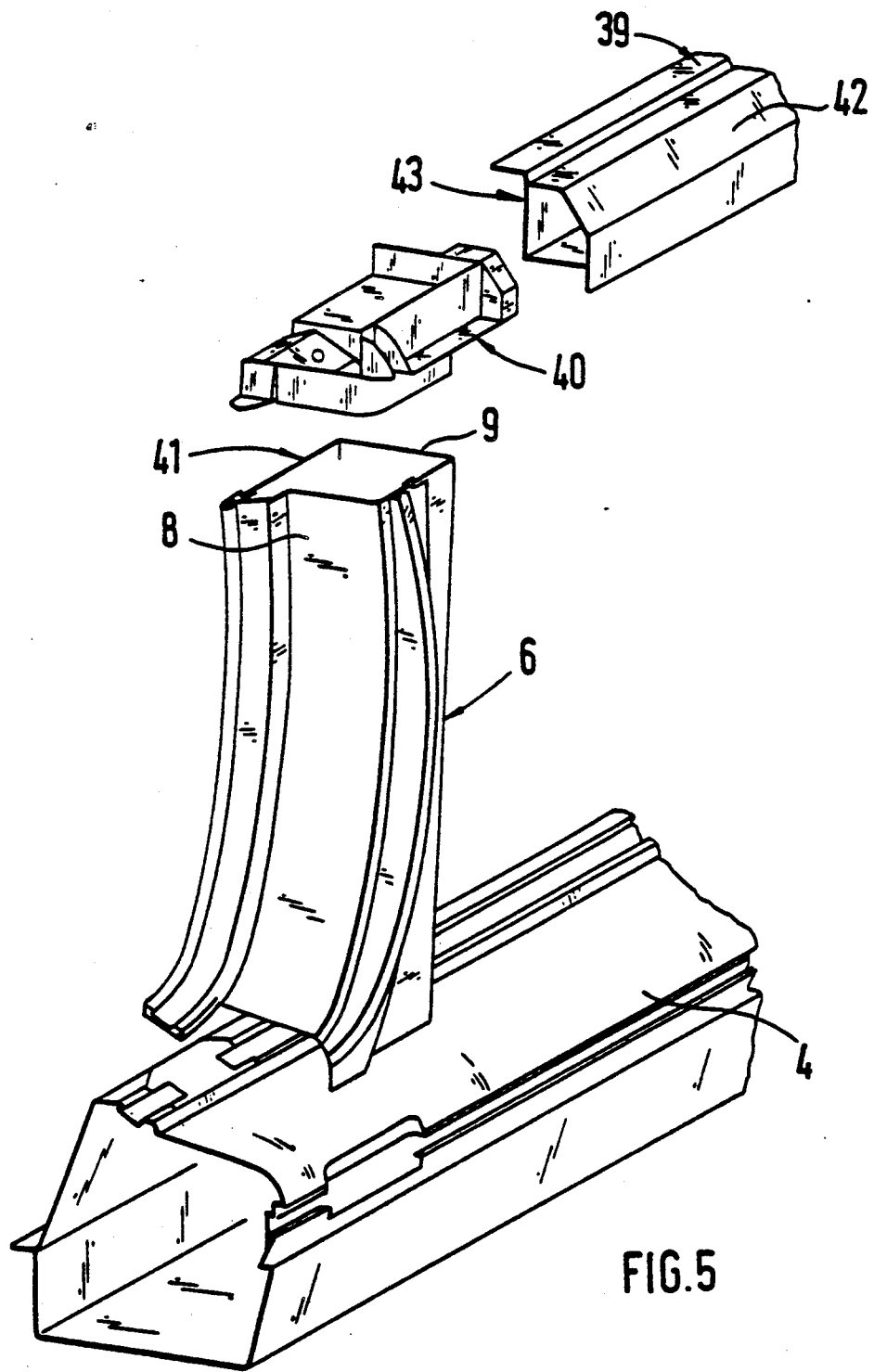
FIG. 5 is a perspective view of another embodiment of a pillar constructed according to the present invention.

FIG. 5 shows another embodiment of an upright pillar 6. In this arrangement, the pillar 6 formed by an extruded profile 8 and a closing part 9 extends only from the side member 4 disposed underneath to approximately the level of a belt line 39 of the passenger car 2. An upper end 41 of the pillar 6, via a junction element 40, is connected with an upper side member 42 of the body structure 1 extending in the area of the belt line 39. By way of a plug-type connection, the junction element 40 interacts with the end 41 of the pillar 6 and an end area 43 of the upper side member 42 and, in addition, can be welded to both body parts 6, 42. In addition, the junction element 40 may be constructed such that it can be used as a bearing plate for a folding top linkage which is not shown in detail.

Figure 6:
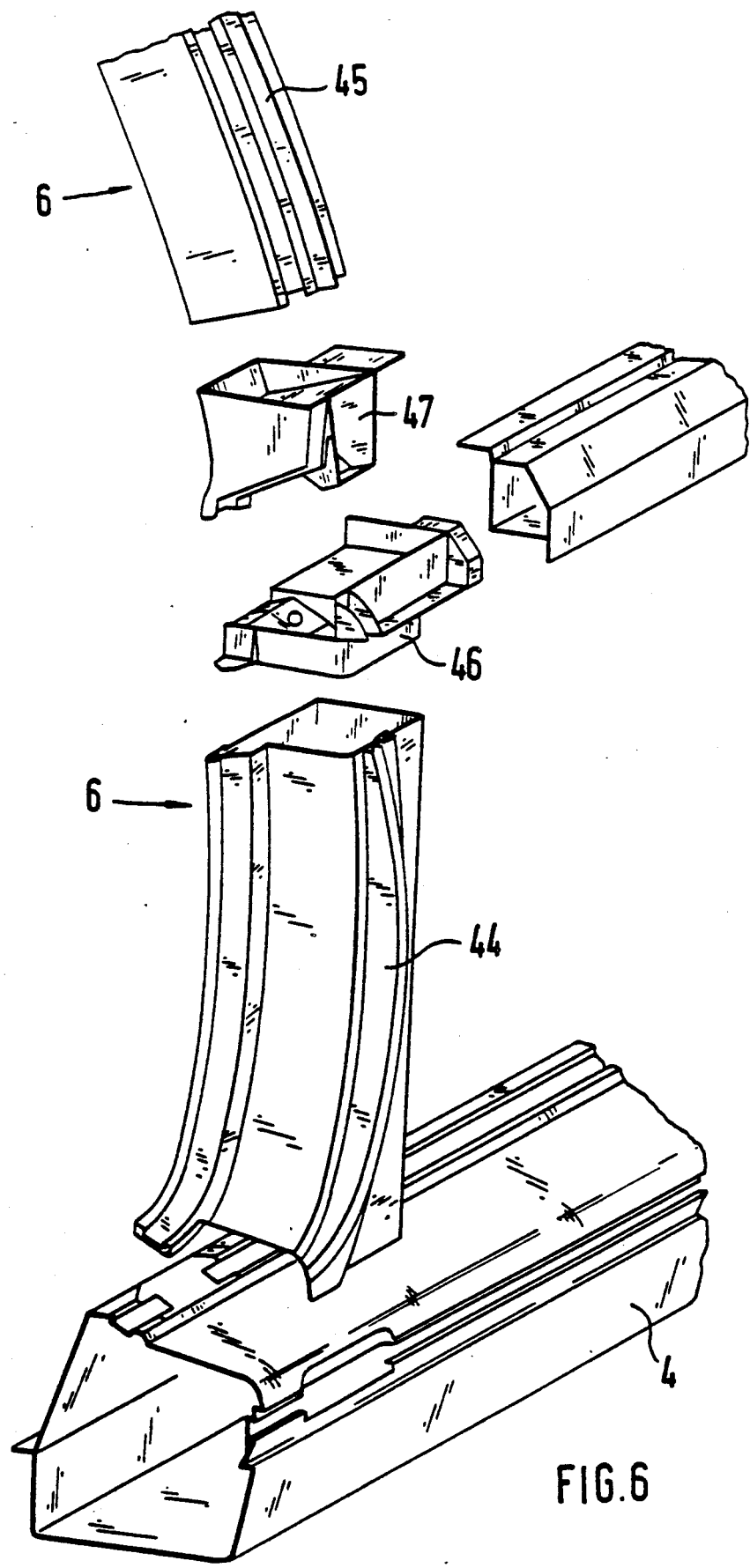
FIG. 6 is a perspective view of still another embodiment of a pillar constructed according to the present invention.

Corresponding to the embodiment of FIG. 6, the pillar 6 comprises a lower section 44 extending from the side member 4 to approximately the level of the belt line 39 and a section 45 extending above the belt line 39. The two sections 44, 45 are connected with one another by means of one or several junction elements 46, 47.

In the arrangement, the upper section 45 may have a smaller cross-section than the lower section 44 of the pillar 6. In addition, the upper section 45 may be formed by a closed hollow profile which is manufactured according to the extrusion method.

By means of a stamping operation, the surface 12 may be deformed locally on the contour 49 for receiving a door lock striker. As a result, the door lock striker is prevented from projecting too far into the opening area of the door.

Above and below the fender fastening, the webs 26 and 31 may be adapted to the outer contour of the vehicle by trimming. As a result, it is achieved that the hollow cross-section of the pillar can receive a maximal cross-section.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An upright pillar for a vehicle body structure that has a side member, the pillar being coupled to the side member disposed underneath the pillar, said pillar having, in a cross-sectional view, the shape of a box-shaped hollow-profile, wherein the pillar includes an extruded profile and a closing part connected with the extruded profile;

wherein the pillar and the vehicle body structure is made of light metal;

wherein the closing part has two edge sections and the extruded profile has first and second approximately U-shaped receiving sections disposed at a distance to one another, and into which the edge sections of the closing part engage.

2. An upright pillar for a vehicle body structure that has a side member, the pillar being coupled to the side member disposed underneath the pillar, said pillar having, in a cross-sectional view, the shape of a box-shaped hollow-profile, wherein the pillar includes an extruded profile and a closing part connected with the extruded profile;

wherein the pillar and the vehicle body structure is made of light metal;

wherein each edge section of the closing part interacts with the pertaining receiving section of the extruded profile via a clamped connection.

3. A pillar according to claim 1, wherein the extruded profile has an open cross-sectional shape.

4. A pillar according to claim 1, wherein the extruded profile, in the lateral view, has a curved shape along a vertical course of the extruded profile.

5. A pillar according to claim 1, wherein each receiving section is formed by an outer straight leg and an inner bent leg.

6. A pillar according to claim 5, wherein the first receiving section is an interior receiving section and the extruded profile has an undercut groove for receiving a sealing body adjacent to the interior receiving section.

7. A pillar according to claim 1, wherein the extruded profile includes a web molded on adjacent to the exterior receiving section, and which extends toward the outside in the transverse direction of the vehicle and which is used for the fastening of a side part or of a fender of the body structure.

8. A pillar according to claim 7, wherein the fender has an end-side flange that is bent away toward the inside, and rests against the web or against a sheet metal nut fitted onto the web and is adjustably held in position by at least one fastening screw.

9. A pillar according to claim 8, wherein the fastening screw is covered by a sealing body and a second web extending at a distance to the first web, the sealing body being disposed on a holding strip which is held in position by the fastening screw.

10. A pillar according to claim 9, wherein the second web has an opening through which a tool for the screwing-in of the fastening screws can be guided, said opening including means for receiving a stopper after the fastening screw has been mounted.

11. A pillar according to claim 1, wherein the extruded profile and the closing part, in the area of the first and second receiving sections are, in addition, connected with one another by additional connecting means.

12. A pillar according to claim 11, wherein the additional connecting means includes at least one of gluing, welding or riveting.

13. A pillar according to claim 11, wherein the extruded additional connecting means are laser beam welding.

14. An upright pillar for a vehicle body structure that has a side member, the pillar being coupled to the side member disposed underneath the pillar, said pillar having, in a cross-sectional view, the shape of a box-shaped hollow-profile, wherein the pillar includes an extruded profile and a closing part connected with the extruded profile;
    wherein the pillar and the vehicle body structure is made of light metal;
    wherein the closing part is formed by at least one of a sheet metal part or by an extruded profile;
    wherein the sheet metal part has an approximately U-shaped cross-section, with two wall sections that extend in parallel to one another and in the longitudinal direction of the vehicle.

15. A pillar according to claim 1, wherein the pillar has a varying cross-section at least along its vertical course.

16. A pillar according to claim 1, wherein the first receiving section is an interior receiving section and the extruded profile has an undercut groove for receiving a sealing body adjacent to the interior receiving section.

17. A pillar according to claim 1, wherein the second receiving section is an exterior receiving section and the extruded profile includes a web molded on adjacent to the exterior receiving section, and which extends toward the outside in the transverse direction of the vehicle and which is used for the fastening of a side part or of a fender of the body structure.

18. A pillar according to claim 17, wherein the fender has an end-side flange that is bent away toward the inside, and rests against the web or against a sheet metal nut fitted onto the web and is adjustably held in position by fastening screws.

19. A pillar according to claim 18, wherein the fastening screw is covered by a sealing body and a second web extending at a distance to the first web, the sealing body being disposed on a holding strip which is held in position by the fastening screw.

20. A pillar according to claim 19, wherein the second web has an opening through which a tool for the screwing-in of the fastening screws can be guided, said opening including means for receiving a stopper after the fastening screw has been mounted.

* * * * *